G. W. BLACKBURN.
SPEEDOMETER.
APPLICATION FILED MAR. 19, 1917

1,289,370.

Patented Dec. 31, 1918.
4 SHEETS—SHEET 1.

Witnesses.
Edward T. Wray.
Christina Deans.

Inventor.
Guy W. Blackburn.
by Parker & Carter
Attorneys.

G. W. BLACKBURN.
SPEEDOMETER.
APPLICATION FILED MAR. 19, 1917.

1,289,370.

Patented Dec. 31, 1918.
4 SHEETS—SHEET 2.

Witnesses.
Edward T. Wray.
Christina Deans.

Inventor.
Guy W. Blackburn,
by Parker & Carter
Attorneys.

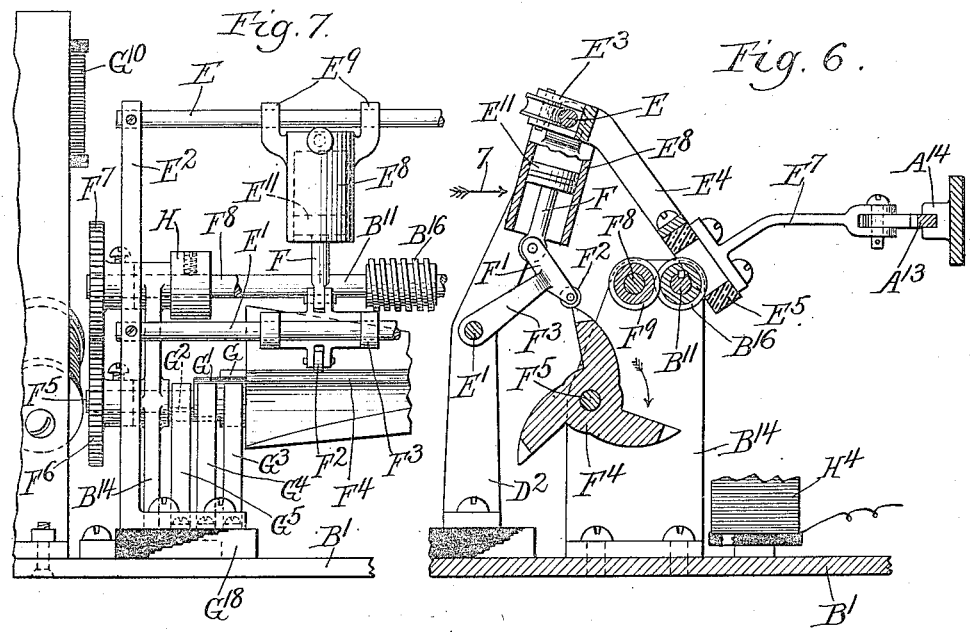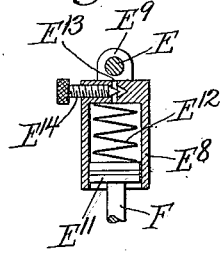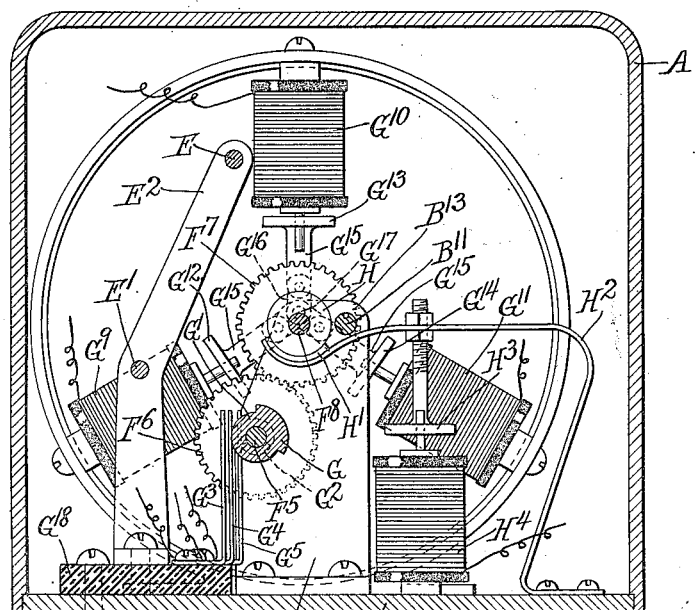

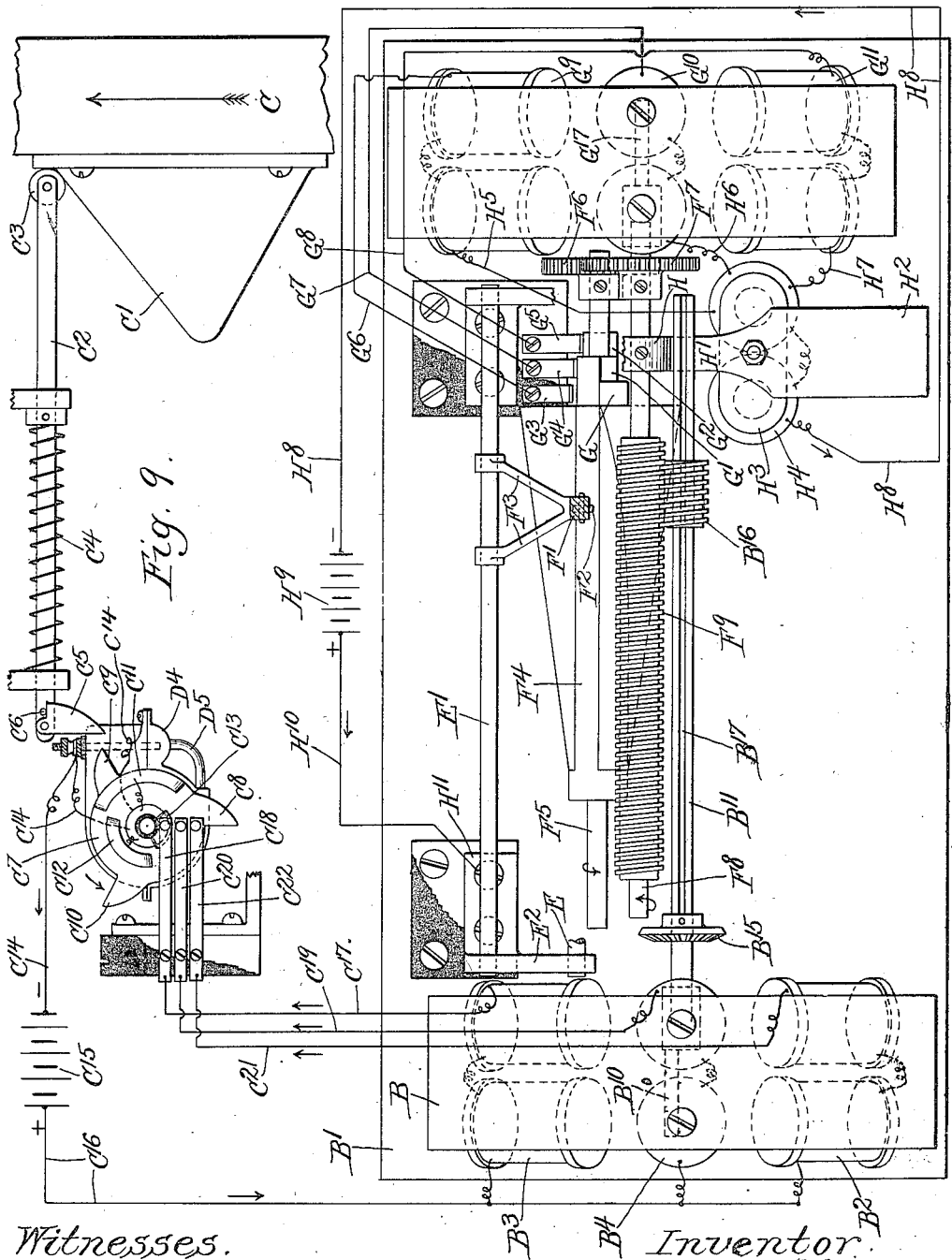

UNITED STATES PATENT OFFICE.

GUY W. BLACKBURN, OF ELGIN, ILLINOIS.

SPEEDOMETER.

1,289,370.

Specification of Letters Patent.   Patented Dec. 31, 1918.

Application filed March 19, 1917.   Serial No. 155,702.

*To all whom it may concern:*

Be it known that I, GUY W. BLACKBURN, a citizen of the United States, residing at Elgin, in the county of Kane and State of Illinois, have invented a certain new and useful Improvement in Speedometers, of which the following is a specification.

My invention relates to improvements in speedometers and has for one object to provide a new and improved form of speedometer, which will indicate the speed of a moving vehicle. It is understood, of course, that the speedometer features might equally well be adapted to other purposes, that is to say, this speedometer, by changing the scale, will operate as a tachometer or revolution counter, or instrument for registering the speed or velocity of a moving shaft, a moving vessel or vehicle as the case may be, and while I have referred to it as a speedometer and illustrated a form which would be particularly adaptable in connection with an automobile as a speedometer, it is obvious that the invention is not so limited. One object of the invention is to provide a speedometer which will be peculiarly sensitive and accurate. Another object is to provide a speedometer wherein the connection between the indicating and recording mechanism and the moving part is a flexible and adjustable connection. Another object is to provide an electric connection between the moving shaft and the indicating mechanism. Other objects will appear from time to time in the specification.

The invention is illustrated more or less diagrammatically in the accompanying drawings, wherein—

Fig. 5 is a section along the line 5—5 of Fig. 2;

Fig. 6 is a section along the line 6—6 of Fig. 2;

Fig. 7 is a rear elevation of the parts shown in Fig. 6 looking in the direction of the arrow 7 in Fig. 6;

Fig. 8 is a detail of the dash-pot shown in Fig. 6 showing the leak port;

Fig. 9 is a wiring diagram showing parts in elevation with parts omitted and parts in section;

Like parts are indicated by like figures in all the drawings.

A is a housing or casing provided with a transparent window $A^1$ and an opaque back $A^2$, which is perforated as indicated to permit the operator to see a portion of the indicator wheel $A^3$. This indicator wheel has marked on it about its periphery numerals or characters to indicate miles per hour, a central line is inscribed across the transparent window in the center of the perforation to mark and make easy the reading of the wheel. $A^4$ is a trip record, and $A^5$ a season mileage record on a mileage counter, which I have not otherwise specifically shown, but which of course forms an integral part of any automobile speedometer. $A^6$ is the drive shaft adapted to operate the mileage counter by means of a worm wheel $A^7$ driven from a worm shaft $A^8$. This worm shaft $A^8$ is rotatably mounted in a bearing $A^9$ on a bracket $A^{10}$, and carries at its inmost end a miter gear $A^{11}$. $A^{12}$ is a pinion rigidly attached to the wheel $A^3$ in mesh with a rack $A^{13}$. This rack is slidably mounted in guides $A^{14}$, and is adapted to rotate the wheel.

B is a ring frame or armature mounted on the base or bottom $B^1$ of the housing A. Equally spaced about its periphery are three electro-magnets $B^2$, $B^3$, $B^4$. $B^5$, $B^6$, $B^7$ are armatures in opposition to the ends of the magnets $B^2$, $B^3$, $B^4$. These armatures have projecting forwardly therefrom and away from the magnet, connecting rods $B^8$, and these connecting rods are pivoted to a star hub $B^9$, which hub in turn is pivoted on a crank pin $B^{10}$ eccentrically mounted on the end of the shaft $B^{11}$. This shaft $B^{11}$ is rotatably mounted in a bearing $B^{12}$ on the bracket $A^{10}$, and in a bearing $B^{13}$ on a bracket $B^{14}$, and a rotation of the crank pin about its center causes a rotation of the shaft $B^{11}$. $B^{15}$ is a miter gear keyed to the shaft $B^{11}$ in mesh with the miter pinion $A^{11}$, so that a rotation of the shaft $B^{11}$ will result in a rotation of the shaft connecting and operating the mileage recorder. $B^{16}$ is a short screw-threaded member slidably mounted on the shaft $B^{11}$, and splined thereon, the shaft being grooved as at $B^7$ for that purpose.

The three radially arranged electro-magnets above referred to, together with their associated parts, form a motor which is adapted to rotate the shaft $B^{11}$ at a rate of speed directly proportional to the rate of movement of the vehicle or the speed of rotation of the shaft, the characteristics of which are to be recorded or indicated. I will now describe the operating connection between this motor and the vehicle wheel.

Figures 1, 2:
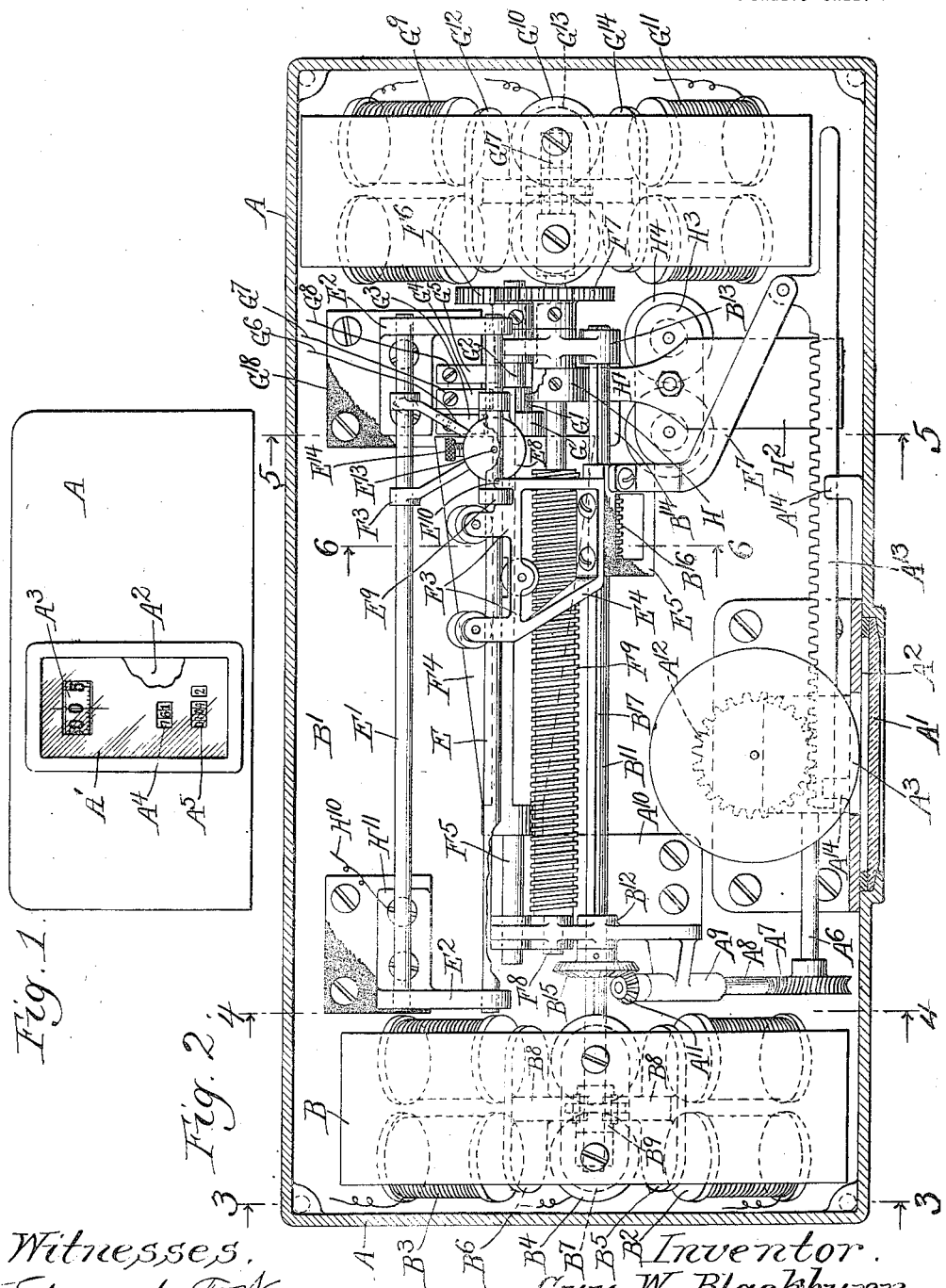
Figure 1 is a front elevation on a small scale.
Fig. 2 is a plan view of the mechanism with the casing in section.
Figure 4:
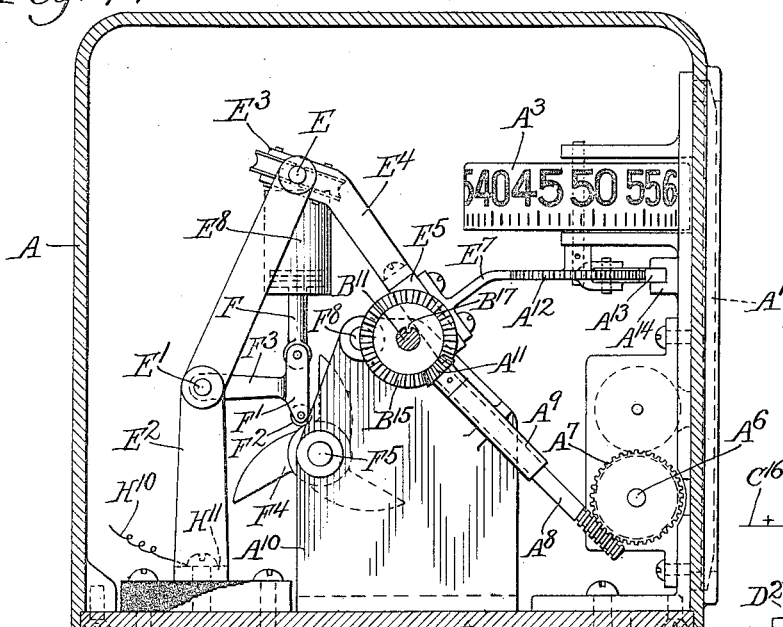
Fig. 4 is a section along the line 4—4 of Fig. 2.

C is a rotating part of the vehicle wheel or shaft. It carries a cam $C^1$. $C^2$ is a slidable pin provided at one end with a cam roller $C^3$ in opposition to the cam $C^1$. A spring $C^4$ is adapted to hold this cam roller in the path of the cam and return it to the position shown in Fig. 1 after each movement by the cam. $C^5$ is a foot pivoted on the free end of the shaft or pin $C^2$ and limited so far as its counter clockwise movement with respect to that shaft is concerned, by a pin $C^6$ while it is free to move in the opposite direction. $C^7$ is a rotatably mounted cam wheel having cam fingers $C^8$, $C^9$, $C^{10}$. These fingers project into the path of the member $C^5$, and it is obvious that at each rotation of the wheel when the pin $C^2$ is moved away from the wheel, the member $C^5$ will catch one of the fingers $C^8$, $C^9$, $C^{10}$ and move it a third of a revolution. The spring will then retract the pin, the member $C^5$ moving a little to one side on pivot connection, if necessary, and the parts will be ready for the next step. Upon the face of the cam wheel $C^7$ are a series of three separate contact segments, $C^{11}$, $C^{12}$, and $C^{13}$. These segments are each insulated one from another by the wheel itself which is preferably made of insulating or nonconducting material. They are, however, electrically connected to the central hub from which a conducting wire $C^{14}$ leads to a battery or other suitable source of electric power $C^{15}$. From this battery a conductor $C^{16}$ leads to each of the electro-magnets $B^2$, $B^3$, $B^4$. $C^{17}$ is a conductor leading from the electro-magnet $B^3$ to a spring contact finger $C^{18}$ in opposition to the contact segment $C^{13}$. $C^{19}$ is a conductor leading from the electro-magnet $B^4$ to the spring contact finger $C^{20}$ in opposition to the contact segment $C^{12}$. $C^{21}$ is a conductor leading from the electromagnet $B^2$ to the spring contact finger $C^{22}$ in opposition to the contact segment $C^{11}$.

It will be evident, of course, that as the wheel C rotates at each rotation thereof the part $C^5$ will engage one of the fingers $C^8$, $C^9$, $C^{10}$ and rotate the switch hub through a third of a revolution, so that the switch hub makes one full revolution for each three revolutions of the wheel. This mechanism is all mounted down on the running gear immediately adjacent the wheel, and the only connection between it and the speedometer is in the electric conductor above described.

Figure 3:
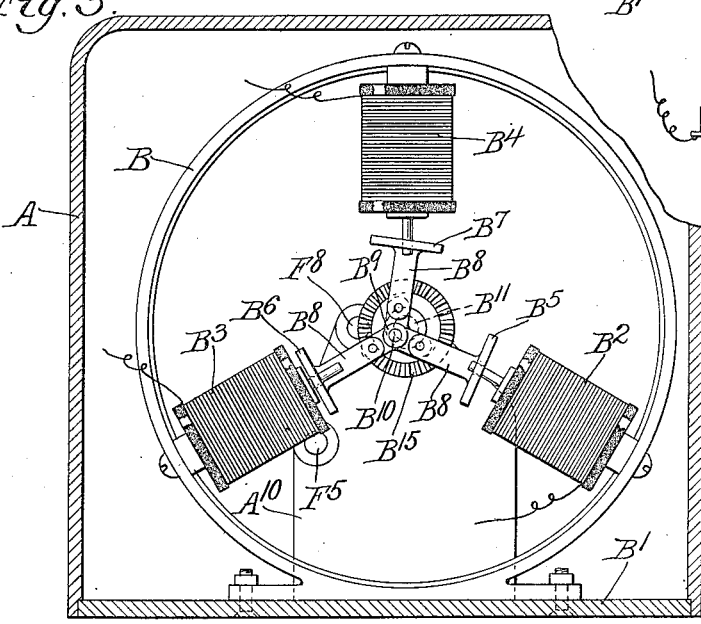
Fig. 3 is a section along the line 3—3 of Fig. 2.
Figure 10:
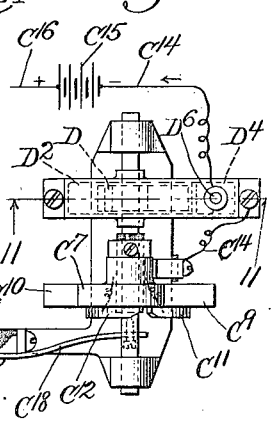
Fig. 10 is a plan view of part of the mechanism shown in Fig. 9.
Figure 11:
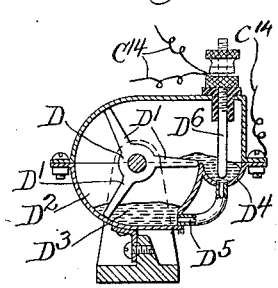
Fig. 11 is a section on the line 11—11 of Fig. 10.

With the parts in the position shown in Fig. 9, the electro-magnet $B^3$ will be energized, the armature will be pulled down by such magnet so that the parts are in the position shown in Fig. 3. At the next reciprocation of the sliding rod the finger $C^{20}$ will come in contact with the segment $C^{12}$, and the magnet $B^4$ will be energized pulling the armature upward and rotating the shaft $B^{11}$ through a third of a revolution in a clockwise direction. The next rotation of the wheel will bring the contact segment $C^{11}$ into engagement with the finger $C^{22}$ to energize the magnet $B^2$, thus pulling on the armature and rotating the crank shaft to another third of a revolution. The next movement the parts will return to the position shown in Figs. 9 and 3. Thus, as the vehicle wheel rotates the shaft $B^{11}$ will be rotated at a speed directly proportional to the rotation or speed of the vehicle by a series of separate increments, and this rotation will continue just as long as the rotation of the vehicle wheel continues and so long as the current is provided by the storage battery or the source of power there will be a direct relation between the vehicle speed and the rotation of the main shaft $B^{11}$. This takes care of the odometer or distance counter because its reading depends only upon the number of revolutions of the vehicle wheel and will not be interfered with by the speed indicating mechanism subsequently to be described.

The wheel D is mounted on a part directly and positively driven by the rotation of the vehicle wheel. This wheel is provided with a series of outwardly projecting paddles or vanes $D^1$ spaced in the preferred form about a third of the circumference apart though they might be differently positioned with respect to the wheel. $D^2$ is a trough in which the vanes $D^1$ travel. The trough extends up on both sides of the wheel and makes a snug fit all the way around with the sides of the wheel and the sides and outer surfaces of the paddle. In this trough is a small amount of mercury $D^3$. This mercury is adapted to be carried up as the shaft rotates and discharged by the paddle into the cup $D^4$ from which it runs back gradually through the passage $D^5$. $D^6$ is a terminal finger extending downwardly into the cup $D^4$ adapted when the cup is filled by the rotating paddle to make the contact with the mercury and close the circuit. The size of the package and the amount of mercury lifted up by each paddle is such that there is always mercury in the cup whenever the vehicle is moving, but if the vehicle should stop moving, there would be no mercury added to the cup to take the place of that which leaks out through the little passage, and so the contact would be broken.

E E$^1$ are track bars parallel with the shaft B$^{11}$ held in position by suitable brackets E$^2$ as indicated. E$^3$ is a roller carriage adapted to travel along the track E. This carriage has downwardly extending therefrom the frame E$^4$ carrying a yoke E$^5$ which yoke rests upon the shaft B$^{11}$ and engages the two ends of the worm B$^{16}$ which worm is splined on and free to slide along but held against rotation about the shaft B$^{11}$. Projecting outwardly from the yoke E$^5$ is an arm E$^7$ and this arm is pivoted on the rack A$^{13}$ so that as the carriage E$^3$ moves back and forth along its track the rack moves with it. E$^8$ is a dash pot cylinder. It is suspended on the rod E by arms E$^9$ one of which is engaged by a finger E$^{10}$ on the carriage E$^3$ so that carriage and dash pot move back and forth together along the track E. This dash pot contains a piston E$^{11}$ slidable therein and inside of the dash pot interposed between the closed upper end thereof and the piston is a spring E$^{12}$. E$^{13}$ is an exhaust passage passing through the closed end of the dash pot adapted to be controlled by the valve E$^{14}$ so that the passage of air into and out of the dash pot cylinder proper may be nicely regulated by the operator.

The piston E$^{11}$ is provided with a downwardly extending piston rod F. This rod is pivoted to a linklike member F$^1$ which member has pivoted at its other end a sharp contact roller F$^2$. F$^3$ is a frame attached to the center of the linklike lever and supporting its frame being pivotally and slidably mounted on the track E$^1$. F$^4$ is an elongated tapered fluted cam member having three vanes adapted to be engaged by the contact wheel F$^2$. This cam member is rigidly mounted on the shaft F$^5$ which shaft is rotatably mounted at one end in the bracket A$^{10}$ as indicated and at the other end in a bracket B$^{14}$ and has on its end a gear F$^6$ in mesh with a gear F$^7$ on a shaft F$^8$ which shaft carries a screw F$^9$ in mesh with and parallel with the worm B$^{16}$.

Mounted on the shaft F$^5$ between the end of the cam member F$^4$ and the pinion on the end of the shaft are three circuit making and breaking cam members G, G$^1$, and G$^2$. These members each extend about one-third of a revolution and have opposed to them spring contact fingers G$^3$, G$^4$ and G$^5$ respectively which fingers are mounted upon an insulating block G$^{18}$ so that they are insulated from the armature of the apparatus while the cam member is not.

It will be noted in this connection that the tracks E E$^1$ are also insulated from the armature of the mechanism in that the brackets supporting them are mounted upon insulating blocks and in that the yoke E$^5$ is made of insulating material. Leading from the contact fingers G$^3$, G$^4$, G$^5$ are conductors G$^6$, G$^7$ and G$^8$, the conductor G$^6$ leading to an electro-magnet G$^9$, the conductor G$^7$ leading to an electro-magnet G$^{10}$ and the conductor G$^8$ leading to an electro-magnet G$^{11}$. These electro-magnets are each of them provided with armatures G$^{12}$, G$^{13}$, G$^{14}$ which armatures have connecting rods G$^{15}$ extending to a star wheel G$^{16}$ pivoted on a crank pin G$^{17}$ as shown on the end of the shaft.

H is a brake drum on the shaft F$^8$. H$^1$ is a brake leaf pressed yieldingly against the brake drum H by the spring H$^2$. H$^3$ is an armature carried by the member H$^1$ in opposition to an electro-magnet H$^4$. Conductors H$^5$, H$^6$ and H$^7$ lead from the electro-magnets G$^9$, G$^{10}$, G$^{11}$ to the electro-magnets H$^4$ and a conductor H$^8$ leads from the electro-magnet H$^3$ to a suitable source of electric power, for instance, a battery H$^9$. The conductor H$^{10}$ leads thence to the base plate H$^{11}$ whereby it is in electric connection with the track member E$^1$.

It will be evident that while I have shown in my drawings an operative device still many changes might be made both in size, shape and arrangement of parts without departing materially from the spirit of my invention and I wish therefore that my drawings be regarded as in a sense diagrammatic.

The use and operation of my invention are as follows:

When the vehicle is at rest the driving electric circuit is dead because the mercury will have run out of the conducting or controlling cup to break the circuit. As soon as the vehicle commences to move, mercury will be fed to the contact cup on the vehicle axle with the first movement of the wheel. This completes the circuit and then as the wheel turns each movement of the cam member past the push rod will drive the controller wheel on the axle through one-third of a revolution thus causing the electro-magnetic engine to operate because as each electromagnet is successively energized it will pull its armature in to rotate the crank shaft through one-third of a revolution and the faster the vehicle wheel turns the more frequently will the different armatures be energized and the more rapidly will the splined shaft rotate and thus the splined shaft will rotate at a speed directly proportional to the rotational speed of the vehicle shaft carrying with it the worm and also driving the odometer or distance indicator.

The rotation of the splined shaft in consonance with the rotation of the vehicle shaft then operates the odometer and gets a direct and positive reading if properly calibrated for the distance covered by the vehicle.

As the splined shaft rotates with the vehicle and as the worm carried by it rotates, that worm, which will then be in mesh with the long screw, will travel as shown in Fig. 9 toward the left, thus moving the carriage and all its associated parts with it toward the left. The result of this will be to bring the contact roller into engagement with the three-branched fluted cam and complete or close the circuit through the controlling system. The controlling electromagnet will then commence its rotation and rotate both the long screw and the cam, and this rotation of the long screw will be opposed in its effect to the rotation of the splined shaft and will tend to cause the worm to move back toward the zero position.

Each time that one of the cam members lifts up the contact roller and drops it, the spring in the dash pot will push it down to complete the circuit at the base of the next cam leaf and during the time occupied by the fall of the roller the circuit will be broken, no current will pass and the controlling system will be at rest. As soon as contact is made, rotation starts until the contact roller is again thrown off.

The nearer the carriage is to the zero position the farther must the contact roller drop and the longer will it take, and since the worm rotates all the time the carriage will be moved toward the left during such dead period in the controlling system. Thus a condition of equilibrium will soon be reached at which the distance moved by the worm during the dead period is equal to the distance gained by the thread in moving the worm back during the energized period of the controlling system and the faster the vehicle travels the farther toward the left will this place be, because if the vehicle travels fast the dead period must be short to enable the screw to bring the worm back and the dead period is shorter when the carriage moves up toward the left where the fall of the contact roller is short.

The time of fall may be adjusted by the operator by changing the size of the opening through which the air rushes in to the dash pot, and this adjustment is used for properly calibrating the instrument. If the opening is wide, the spring will throw the contact roller down rapidly. If the opening is small, the time for the fall of the contact roller will be increased.

The circuit breaker operates to break the vehicle controlled circuit when the vehicle comes to a rest but the timing circuit is not broken until the speed indicator is returned to the zero position as indicated.

When the vehicle comes to rest, the driving system stops, but the controlling system continues, the screw rotating by short spells of activity and quiet until the worm has been propelled down to the extreme right when the contact roller finally gets clear off the cam, thus breaking the circuit and stopping operations until the circuit is again closed by the operation of the driving system.

It will be understood that by means of the two electro-magnetic motors whose speed can be positively controlled so that they only run when power is on and stop substantially at once when power is off, I can control the speed of the two engaging parts with great nicety, so as to balance them and balance their speed one against the other, so that their position along the cam which controls the time interval during which one circuit is open will accurately control the whole system to give a direct and absolute velocity reading. It will be understood also that if there is overrunning of one system or the other after the power is off, it will be balanced by a substantially equal tendency toward overrunning in the other system and thus no inaccuracy can possibly develop when the device is properly adjusted and properly calibrated.

As soon as the timing circuit is closed, the electromagnetic motor driving the timing or electric mechanism commences to operate, because one of the electromagnets is always in the operating position and by pulling on its armature will rotate the shaft.

This shaft as it rotates drives the cam shaft and the rotation of the cam shaft operates by means of the conducting fingers and the circuit making and breaking cam members to cause successive electromagnets to be energized thus continuing the rotation of the shaft.

It will be noted that the spring held brake is drawn away from engagement with the brake drum by its electromagnet which is in circuit with each of the electromagnets forming the engine so that whenever the device is in operation the brake is off but whenever the circuit is open the brake automatically goes on.

If there were a permanent connection between the source of power and the circuit making and breaking cams the speed at which the timing engine rotates would be limited only by the electric power available and the frictional resistance of the load carried and no speedometer reading could be obtained. In order to get the speedometer or speed reading, therefore, directly proportional to and responsive to the speed at which the vehicle is traveling, I have provided an automatic control means for controlling the operation of the timing engine which has previously been described.

This automatic control operates by cutting off the current in the timing engine for variable short time intervals depending on the speed of the vehicle and thus controlling the speed of the timing engine.

If the screw driven by the timing engine were at rest the worm driven by the other engine would climb up the screw tending to move toward the left in Fig. 9. If the timing engine ran at full speed without control the screw would run away from the worm and the worm would tend to move toward the right in Fig. 9.

My controlling mechanism, therefore, provides means for controlling the speed of rotation of the screw so that the tendency of the worm to travel in one direction and of the screw to draw it in another is counterbalanced or equalized until the worm comes to rest so far as its longitudinal movement along the splined shaft is concerned at a point directly proportional as the instrument is calibrated to the speed of the vehicle.

It will be understood that it takes three revolutions of the vehicle wheel to make one revolution of the electro-magnetic driving engine because the three electromagnets in the engine must each make one stroke to make a full revolution of the engine shaft and by the cam arrangement driven by the vehicle wheel this can only be possible when three strokes, that is to say, three revolutions of the vehicle wheel, have been made. It is obvious, of course, that if the rotational speed of the vehicle wheel is sufficiently slight, there will be a pause between each one third revolution of the electromagnetic engine, because the instant the circuit is closed the engine will rotate a third of a revolution, and then stop, though conceivably of course at very high speeds the engine may not have time to complete its revolution much, if any, before the increased impulse is given.

It will be understood that the controlling engine travels also by a series of successive stops, there being a pause between each stop so as to give the contact wheel time to drop from the crest of one cam leaf to the base of the next. Thus these two engines operate by stops with pauses between. The device is arranged so that as these two engines drive the indicator in opposite directions, there comes a time when, as the indicator moves along and as the contact roller moves along the cam, the stops coincide so that finally you reach a point after the carriage has completed its upward movement where the pauses in the two systems occur at the same time, and the driving impulse in the two systems occur at the same time, thus there is no movement of the indicator or carriage. If the speed changes there will be a gradual step by step movement until the indicator assumes a new position, where the time between the impulse given by the vehicle wheel equals the time between the impulse controlled by the drop of the conductor roller, and this relation will prevail with all speeds of the vehicle, because while the time between impulse by the roller wheel varies, the time between impulse controlled by the cam also varies at the same rate. If, for any reason, the system is pulled off its proper indicating position, the cam will change the time between impulse or the length of time between the separate impulse to compensate for the incorrect position and bring the parts back into that relation at which the indicator will show no movement.

I claim:

1. A speedometer for motor vehicles and the like, comprising an electric motor, means for driving it at a speed directly in proportion to the vehicle speed, an indicator partially driven by said motor, and means for driving said indicator in opposition to said motor, the speed at which such opposition driving means are operated being controlled by the position of the indicator.

2. A speedometer for motor vehicles and the like comprising an indicating mechanism, two separate driving means therefor adapted conjointly to operate upon the indicating mechanism to drive it in different directions at different speeds, the speed of one of said driving mechanisms varying independently of the indicating mechanism, the speed of the other being directly dependent upon and controlled by the indicating mechanism.

3. A speedometer comprising two meshing screw-threads pitched in the same direction movable longitudinally with respect one to another, means for driving them separately and in the same direction, the driving speed of one of said screws being independent of their relative longitudinal position, the driving means for the other being adapted to change its speed in response to the change in longitudinal position of the two screws with respect one to another.

4. A speedometer comprising two meshing screw threads movable longitudinally with respect one to another, means for driving them separately, the driving speed of one of said screws being independent of their relative longitudinal position, the driving means for the other being adapted to change its speed in response to the change in longitudinal position of the two screws with respect one to another, said means comprising in both cases an electric motor the change speed mechanism being driven by said motor and comprising a cam adapted to make and break the circuit driving said motor.

5. A speed indicator for vehicles and the like comprising a pair of electric motors, and means for driving said motors at all times when the vehicle is in operation, means for automatically discontinuing said drive upon the stopping of the vehicle.

6. A speed indicator for motor vehicles and the like comprising two driving motors, an indicating motor, a driving connection between both driving members and the indicating member, and means for operating said driving motors by a series of successive short steps, means responsive to the speed of the vehicle and including said driving motors and connections for bringing the indicator member into a position of rest while such driving motors are in operation.

7. A speed indicator for vehicles and the like comprising a pair of electric motors, means for driving them at controlled speeds, a movable indicator and driving connections between each motor and the indicator operating independently and in opposition.

8. A speed indicator for vehicles and the like comprising a pair of electric motors, means for driving them at controlled speeds, a movable indicator and driving connections between each motor and the indicator operating independently and in opposition, means for driving one of said motors at a speed directly proportional to the vehicle speed.

9. A speed indicator for vehicles and the like comprising a pair of electric motors, means for driving them at controlled speeds, a movable indicator and driving connections between each motor and the indicator operating independently and in opposition, means for driving one of said motors at a variable speed depending upon the position of the indicator.

10. A speed indicator for vehicles and the like comprising a pair of electric motors, means for driving them at controlled speeds, a movable indicator and driving connections between each motor and the indicator operating independently and in opposition, means for driving one of said motors at a variable speed depending upon the position of the indicator and for driving the other at a variable speed directly responsive to the speed of the vehicle.

11. A speed indicator for vehicles comprising a plurality of electro-magnetic motors, means for successively exciting the magnets forming such motors to drive them, an indicator and driving connections between it and each motor operating separately upon it in opposition and means responsive to the position of such indicator for controlling the speed at which one of said motors is driven.

12. A speed indicator for vehicles comprising a plurality of electro-magnetic motors, means for successively exciting the magnets forming such motors to drive them, an indicator and driving connections between it and each motor operating separately upon it in opposition and means responsive to the position of such indicator for controlling the speed at which one of said motors is driven such means comprising means for making and breaking the circuit a plurality of times during each revolution to successively excite the electro-magnets.

13. A speed indicator for vehicles comprising a plurality of electro-magnetic motors, means for successively exciting the magnets forming such motors to drive them, an indicator and driving connections between it and each motor operating separately upon it in opposition and means responsive to the position of such indicator for controlling the speed at which one of said motors is driven such means comprising means for making and breaking the circuit a plurality of times during each revolution to successively excite the electro-magnets, said means comprising a circuit making and breaking cam and a delay action circuit closing means in opposition to said cam.

14. A speed indicator for vehicles comprising a plurality of electro-magnetic motors, means for successively exciting the magnets forming such motors to drive them, an indicator and driving connections between it and each motor operating separately upon it in opposition and means responsive to the position of such indicator for controlling the speed at which one of said motors is driven such means comprising means for making and breaking the circuit a plurality of times during each revolution to successively excite the electro-magnets, said means comprising a circuit making and breaking cam and a delay action circuit closing means in opposition to said cam the said cam being adapted to control the length of time during which the circuit is open between each excitation of the magnets.

15. A speed indicator for vehicles and the like comprising a pair of electric motors and means for driving such motors at all times when the vehicle is in operation, means operative immediately upon discontinuance of the movement of the vehicle for automatically discontinuing the operation of one of said motors and means subsequently operative for automatically discontinuing the operation of the other.

16. A speed indicator for vehicles and the like comprising a pair of electric motors and means for driving such motors at all times when the vehicle is in operation, means operative immediately upon discontinuance of the movement of the vehicle for automatically discontinuing the operation of one of said motors and means subsequently operative for automatically discontinuing the operation of the other, said last means operative only when the speed indicator has returned to the zero position.

17. A speed indicator for vehicles and the like comprising a pair of motors, a speed indicating mechanism, and a driving connection between it and each motor operating independently and upon the indicating mechanism, means for driving one of said motors at a variable speed depending on the speed of the vehicle and means for driving the other at a variable speed depending on the position of the indicating mechanism.

18. A speedometer comprising two meshing screw threads pitched in the same direction, one being longitudinally movable, the other longitudinally fixed, separate means for driving them, the driving means of the movable screw being independent of the relative longitudinal position of the screws and the driving means of the longitudinally fixed screw being adapted to change its speed in response to the change in relative longitudinal position of the two screws.

19. A speedometer comprising two meshing screw threads pitched in the same direction, one being longitudinally movable, the other longitudinally fixed, separate means for driving them in the same direction the driving means of the movable screw being independent of the relative longitudinal position of the screws and the driving means of the longitudinally fixed screw being adapted to change its speed in response to the change in relative longitudinal position of the two screws.

20. A speedometer for motor vehicles and the like comprising two electric motors, means for driving them, a shaft driven by each motor, said shafts being parallel, said shafts carrying meshing screws, one of said screws being rigidly mounted on its shaft, the other mounted for longitudinal motion with relation to its shaft and to the other screw and means for recording speed governed by said longitudinally moving screws.

21. In a speedometer for motor vehicles and the like a screw threaded shaft and means for rotating it, a track bar parallel thereto, a carriage mounted to travel therealong, a screw controlling the movement of said carriage along the track bar said screw being in mesh with the screw threaded shaft, means for rotating said screw to move it along the shaft, a speed indicating mechanism and a connection between said mechanism and the roller carriage.

22. In a speedometer for motor vehicles and the like two parallel shafts and means for rotating them a screw thread rigidly mounted on one shaft, a screw in mesh with it mounted for longitudinal movement along the other shaft, track bar parallel to said shafts, a carriage mounted to travel therealong, a connection between the carriage and the traveling screw, speed indicating mechanism and a connection between said mechanism and the carriage.

23. In a speedometer for motor vehicles and the like two parallel shafts and means for rotating them a screw thread rigidly mounted on one shaft, a screw in mesh with it mounted for longitudinal movement along the other shaft, track bar parallel to said shafts, a carriage mounted to travel therealong, a yoke depending from said carriage engaging the ends of the traveling screw, speed indicating mechanism and a connection between said mechanism and the carriage.

24. In a speedometer for motor vehicles and the like a plurality of electromagnetic motors, electric circuits therefor, an indicator and driving connections between it and each motor operating separately on it and means responsive to the position of such indicator for controlling the speed at which one of said motors is driven comprising means for making and breaking its electric circuit a plurality of times during each revolution to successively excite the electromagnets at intervals depending on the position of the indicator.

25. In a speedometer for motor vehicles and the like a plurality of electromagnetic motors, electric circuits therefor, an indicator and driving connections between it and each motor operating separately on it and means responsive to the position of such indicator for controlling the speed at which one of said motors is driven comprising means for making and breaking its electric circuit a plurality of times during each revolution to successively excite the electromagnets at intervals varying in length in response to the movement of the indicator.

26. In a speedometer for motor vehicles and the like a plurality of electromagnetic motors, electric circuits therefor, an indicator and driving connections between it and each motor operating separately on it and means responsive to the position of such indicator for controlling the speed at which one of said motors is driven comprising means for making and breaking its electric circuit a plurality of times during each revolution to successively excite the electromagnets at intervals depending on the position of the indicator said means consisting of a cam shaft parallel with the path of movement of said indicator and means for rotating it, a plurality of vanes mounted longitudinally thereon, a roller adapted to contact them successively as the cam shaft is rotated, said vanes tapered uniformly toward one end of the cam shaft, and means for making an electric circuit through said cam shaft and contacting roller to the motor.

27. In a speedometer for motor vehicles and the like operated by a plurality of electromagnetic motors, electric circuits therefor means for controlling the speed at which one of said motors is driven comprising a circuit making and breaking device consisting of a cam shaft rotated by said motor, a plurality of vanes mounted longitudinally thereon, a track rod parallel with said cam shaft, a frame depending therefrom, a roller mounted on said frame adapted to contact said vanes as they rotate, and means for setting up an electric circuit through said roller and cam shaft to the motor.

28. In a speedometer for motor vehicles and the like operated by a plurality of electromagnetic motors, electric circuits therefor means for controlling the speed at which one of said motors is driven comprising a circuit making and breaking device consisting of a cam shaft rotated by said motor, a plurality of vanes mounted longitudinally thereon, a plurality of track rods parallel with said cam shaft, a dash pot depending from one of said rods, a piston rod extending therefrom, a framework mounted on a second track rod pivoted to said piston rod, a roller mounted on said frame adapted to contact said vanes as they rotate and means for setting up an electric circuit through said roller and cam shaft to the motor.

29. In a speedometer for motor vehicles and the like operated by a plurality of electromagnetic motors, electric circuits therefor means for controlling the speed at which one of said motors is driven comprising a circuit making and breaking device consisting of a cam shaft rotated by said motor, a plurality of vanes mounted longitudinally thereon said vanes uniformly tapered toward one end of the cam shaft, a track rod parallel with said cam shaft a frame depending therefrom, a roller mounted on said frame adapted to contact said vanes as they rotate, and means for setting up an electric circuit through said roller and cam shaft to the motor and means for controlling the intervals of contact by moving said roller longitudinally along the cam shaft.

30. In a speedometer for motor vehicles and the like operated by a plurality of electromagnetic motors, electric circuits therefor means for controlling the speed at which one of said motors is driven comprising a circuit making and breaking device consisting of a cam shaft rotated by said motor, a plurality of vanes mounted longitudinally thereon said vanes uniformly tapered toward one end of the cam shaft, a plurality of track rods parallel with said cam shaft, a dash pot depending from one of said rods, a piston rod extending therefrom, a framework mounted on a second track rod pivoted to said piston rod, a roller mounted on said frame adapted to contact said vanes as they rotate and means for setting up an electric circuit through said roller and cam shaft to the motor and means for controlling the intervals of contact by moving said roller longitudinally along the cam shaft.

31. In an electric speedometer for motor vehicles and the like, means for making and breaking the current comprising a track shaft and a parallel cam shaft, a cam contacting member movable along the track shaft, a plurality of vanes mounted longitudinally along the cam shaft, means for passing an electric current through said cam shaft and said cam contacting member, and means for rotating said cam shaft alternately to make and break the contact of the vanes and the cam contacting member.

32. In an electric speedometer for motor vehicles and the like, means for making and breaking the current comprising a track shaft and a parallel cam shaft, a cam contacting member movable along the track shaft, a plurality of vanes mounted longitudinally along the cam shaft, means for passing an electric current through said cam shaft and said cam contacting member, and means for rotating said cam shaft alternately to make and break the contact of the vanes and the cam contacting member, said vanes tapered toward one end of the cam shaft.

33. In a speedometer for motor vehicles and the like operated by a plurality of electromagnetic motors, electric circuits therefor, parallel shafts rotated each by a motor, a longitudinally fixed screw mounted on one shaft, a longitudinally movable screw in mesh with it, mounted on the other, a yoke movable with said screw, a track bar parallel with the shafts, a cam contacting member mounted thereon, and longitudinally movable therealong, a positive connection between said member and said yoke, a cam shaft parallel with said track bars, and adapted to be rotated by one of said motors, said cam shaft positioned periodically to contact said cam contacting member.

In testimony whereof, I affix my signature in the presence of two witnesses this 14th day of March, 1917.

GUY W. BLACKBURN.

Witnesses:
MINNIE M. LINDENAU,
MARION L. INGRAHAM.